United States Patent [19]
Scheer et al.

[11] Patent Number: 6,016,684
[45] Date of Patent: Jan. 25, 2000

[54] CERTIFICATION OF AN ATOMIC-LEVEL STEP-HEIGHT STANDARD AND INSTRUMENT CALIBRATION WITH SUCH STANDARDS

[75] Inventors: Bradley W. Scheer, San Jose; J. Jerry Prochazka, Clayton, both of Calif.

[73] Assignee: VLSI Standards, Inc., San Jose, Calif.

[21] Appl. No.: 09/037,806

[22] Filed: Mar. 10, 1998

[51] Int. Cl.$^7$ ................................................. G01B 11/30
[52] U.S. Cl. ........................................ 73/1.89; 250/252.1
[58] Field of Search ...................... 73/1.89; 250/252.1 R, 250/252.1 A; 356/243.4, 243.3, 243.7, FOR 106

[56] References Cited

U.S. PATENT DOCUMENTS 5,599,464   2/1997   Laird et al. ................................. 216/2

FOREIGN PATENT DOCUMENTS 196559   8/1993   Japan ...................................... 73/1.89

OTHER PUBLICATIONS

Derwent Information LTD "Calibration Standard for micro–roughness measuring instrument" abstract of WO99–08065 dated Feb. 18, 1999 Derwent week 199916, copyright stated to be 1998 but probably 1999 Derwent–Acc–No. 1999–180529.

P. Z. Takacs et al., "A Step–Height Standard for Surface Profiler Calibration", SPIE vol. 1995 Optical Scattering (1993), pp. 235–244, month not given.

J. Stover, "Requirements and suggestions for industrial smooth surface microroughness standards", SPIE vol. 2862, pp. 69–77, Proceedings, Aug. 8–9, 1996, Denver, CO.

E. L. Church et al., "Direct comparison of mechanical and optical measurements of the finish of precision machined optical surfaces", Optical Engineering, May/Jun. 1985, vol. 24, No. 3, pp. 388–395.

E. L. Church et al., "The prediction of BRDFs from surface profile measurements", SPIE vol. 1165, Scatter from Optical Components (1989), pp. 136–150, month not given.

J. C. Stover, "Roughness characterization of smooth machined surfaces by light scattering", Applied Optics, vol. 14, No. 8, Aug. 1975, pp. 1796–180Z.

E. L. Church et al., "Relationship between Surface Scattering and Microtopographic Features", Optical Engineering, Mar.–Apr. 1979, vol. 18, No. 2, pp. 125–136.

W. M. Bullis, "Microroughness of Silicon Wafers", Semiconductor Silicon, Proc. Silicon Material, Science Technology, May 1994 pp. 1156–1169.

B. W. Scheer, "Developing a haze and microroughness reference standard", Micro, Jun. 1996, published by Canon Communications, 12 pages.

(List continued on next page.)

*Primary Examiner*—Thomas P. Noland
*Attorney, Agent, or Firm*—Thomas Schneck; Mark Protsik

[57] ABSTRACT

An atomic-level step-height standard with step heights less than about 100 Å is in the form of a silicon wafer die with a generally smooth reflective surface but with a periodic pattern of alternating parallel flat linear mesas and valleys having a rectangular cross-section. The periodicity of this pattern of surface features is less than 100 $\mu$m and preferably about 20 $\mu$m. Certification of the standard involves measuring the pitch and the line or space width of the mesas or valleys using a calibrated probe microscope in order to determine the pattern's duty cycle (C), and also measuring a bidirectional reflectance distribution function for light scattered from the periodic pattern using an angle-resolved scatterometer. From this measurement, a one-dimensional power spectral density function is calculated, then an RMS roughness ($R_q$) value is derived. The characteristic step height (H) of the standard can then be certified as being $H=R_q\,[C(1-C)]^{-\frac{1}{2}}$, provided the measurements and calculations are done over a sufficiently wide spatial frequency bandwidth. The certified standard may then be used to calibrate various step-height measuring instruments.

11 Claims, 5 Drawing Sheets

OTHER PUBLICATIONS

E. L. Church et al., "Comparison of optical and mechanical measurements of surface finish", SPIE vol. 1531, Advanced Optical Manufacturing and Testing II (1991), pp. 234–250, month not given.

M. L. Hitchman et al., "Calibration standards for surface profile monitors", J. Phys. E: Sci. Instrum., vol. 13, 1980, pp. 19–20, month not given.

T. Ohmi et al., "Calibration of height in atomic force microscope images with subnanometer scale silicon dioxide steps", Appl. Phys. Lett. 61 (20), Nov. 16, 1992, pp. 2479–2481.

Pub. 1995, month not given, Handbook of Optics, vol. I, chapter 7, pp. 7.1—7.14, Second Edition, published by McGraw–Hill, Inc., "Surface Scattering" E. L. Church et al.

Pub. 1995, month not given, Handbook of Optics, vol. II, chapter 26, pp. 26.1—26.16, Second Edition, published by McGraw–Hill, Inc., "Scatterometers" John C. Stover.

CERTIFICATION OF AN ATOMIC-LEVEL STEP-HEIGHT STANDARD AND INSTRUMENT CALIBRATION WITH SUCH STANDARDS

TECHNICAL FIELD

The present invention relates to measurement of surface profile of topographic features on generally smooth surfaces, and in particular to measuring the height of step features on such surfaces using any of various mechanical or optical profiling instruments. The invention relates especially to calibration of step-height measuring instruments using a step-height calibration standard and to the certification of such standards.

BACKGROUND ART

A step height standard is useful for calibrating surface profiling instruments. One such standard is disclosed by Peter Z. Takacs and Eugene L. Church in an article entitled "A Step-Height Standard for Surface Profiler Calibration" in *SPIE* Vol. 1995 *Optical Scattering* (1993), pp. 235–244. That standard includes a flat region with a single central step anisotropically etched therein and also includes two laminar profile bar patterns of 50 $\mu$m and 10 $\mu$m pitch. The single step is useful for calibrating optical profilers, while the bar patterns are useful for calibrating stylus profilers. The bar pattern ensures that the stylus probe will find an edge on the first try regardless of its lateral position. The peak-to-valley height of steps are approximately 150 nm.

Recently, techniques have been developed to make smaller scale vertical features. One such method for use in making calibration standards is described in U.S. Pat. No. 5,599,464 to Laird et al., assigned to the assignee of the present invention. With that method, features having vertical heights on the order of 10 Å (1 nm) can be consistently made. The patent further discloses that millions of such features can be produced simultaneously on a wafer to simulate the effect of haze or microroughness on a polished wafer, and thereby be useful as a microroughness standard.

John C. Stover in an article entitled "Requirements and suggestions for industrial smooth surface microroughness standards" in *SPIE* vol. 2862 Proceedings, 8–9 August 1996, Denver, Colo., pp. 69–77, suggests a microroughness standard having a grating with a rectangular cross-section and a 50% duty cycle. With that standard the resulting power spectral density (PSD) is composed of an infinite series of harmonically related peaks (with even orders missing when the duty cycle is 50%) whose amplitudes relate to the height of the grating steps and which fall off as $f^{-2}$, where f is the spatial frequency related to the pitch of the grating. Moreover, the RMS microroughness value is found by taking the square root of the sum of that series of peaks (out to about the 21st order).

In the case of step height standards, it has been found difficult to verify the step height in order to certify the standard when the step heights become less than about 50 Å. For example, when atomic force microscopes are used to measure epitaxial silicon step height directly, the step height value obtained depends on the exact crystal orientation of the wafer and can easily be off by as much as 20%.

It is an object of the present invention to provide a method of certifying a step-height calibration standard with proved traceability and a method of calibrating step-height measuring instruments with the calibration standard certified by the first method.

DISCLOSURE OF THE INVENTION

The object is met with a method that makes use of a rectangular-grating type microroughness standard and employs it as a step-height standard instead. The standard is a physical artifact having a generally smooth reflective surface but with regular features formed on the surface. These regular features are a periodic pattern of alternating parallel flat linear mesas and valleys with a one-dimensional (1D) square-wave (rectangular) cross-section. The characteristic step height (mesa-to-valley) is at most 100 Å and the periodicity or pitch (P) of the pattern is less than 100 $\mu$m, and preferably about 20 $\mu$m.

The certification method includes measuring the pitch of the periodic pattern of surface features and at least one of the line width (L) of the mesa features and the space width (S) of the valleys using a calibrated probe microscope, such as an atomic force microscope. From this measurement, a duty cycle (C) of the pattern is derived, where $C=L/P=1-(S/P)$. Preferably, the standard being certified has a duty cycle of about 50%. The certification method further includes use of an angle-resolved scatterometer to measure a bidirectional reflectance distribution function (BRDF) for light scattered from the periodic pattern of surface features on the standard. From this measurement and the derived duty cycle, the characteristic step height (H) is ultimately determined by a series of calculations. Those calculations involve obtaining a 1D power spectral distribution (PSD) function from the measured BRDF values, then deriving an RMS roughness ($R_q$) value from the PSD function, and finally determining the characteristic step height (H) from the $R_q$ value according to the equation $H=R_q[C(1-C)]^{-\frac{1}{2}}$. The measurements and calculations should be done over a spatial frequency bandwidth of at least from $f_{min} \approx 1/(2P)$ to $f_{max} \geq 25\ f_{min}$ for sufficient accuracy of the certified step height value.

Once the step-height calibration standard has been certified it can be used to calibrate step-height measuring instruments of many types. The standard, now with known pitch, duty cycle, and characteristic step height, is placed in the measuring instrument. The step height of the standard is measured with the instrument to be calibrated according to the techniques specific to that instrument, and the measured result is then compared with the known certified values. As in all calibration techniques, the comparison is used to make adjustments to the instrument to bring the measured step height value in line with the certified value. Multiple successive measurements with intervening adjustments may be needed to complete the calibration.

The certification method of the present invention allows standards of much smaller step height to be certified than previous techniques. In particular, the invention is a result of a recognition that a prior microroughness standard has characteristics that precisely relate measured microroughness via optical scattering to step height of the features on the standard. Accordingly, this particular type of microroughness standard has been discovered to be useful as a step height standard as well.

BEST MODE OF CARRYING OUT THE INVENTION

Figure 1:
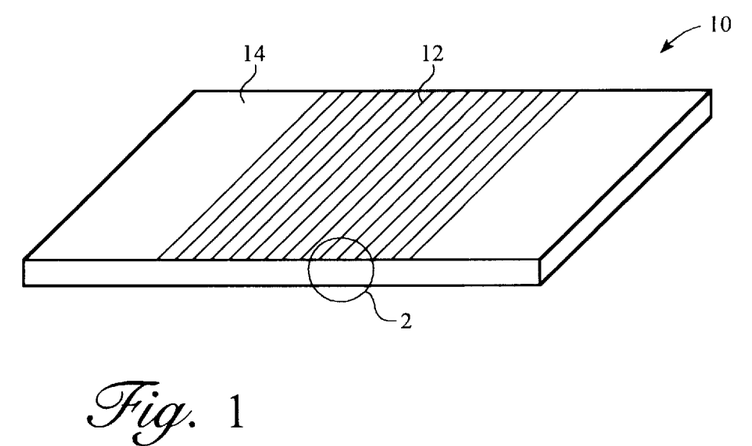
FIG. 1 is a perspective view of an article used as a step-height standard in the present invention.

With reference to FIG. 1, the calibration standard is a physical artifact in the form of a silicon wafer die 10 having a pattern of regular surface features 12 formed in the top surface 14 of the die. The die may be approximately 525 µm thick and have major surface dimensions of 7 mm by 14 mm. The pattern of surface features 12 may occupy a 7 mm by 7 mm area of the top surface 14. These dimensions however are not critical and should be considered strictly exemplary. The die may be mounted on a larger substrate, such as a 50 mm by 50 mm by 6 mm thick quartz substrate for use on profilometer stages, or could be unmounted for use with atomic force an microscope (AFM) or other scanning probe microscope (SPM) which have limited inspection areas. The die form can thus be selected based upon the substrate handling capabilities of the instrument to be calibrated.

Figure 2:
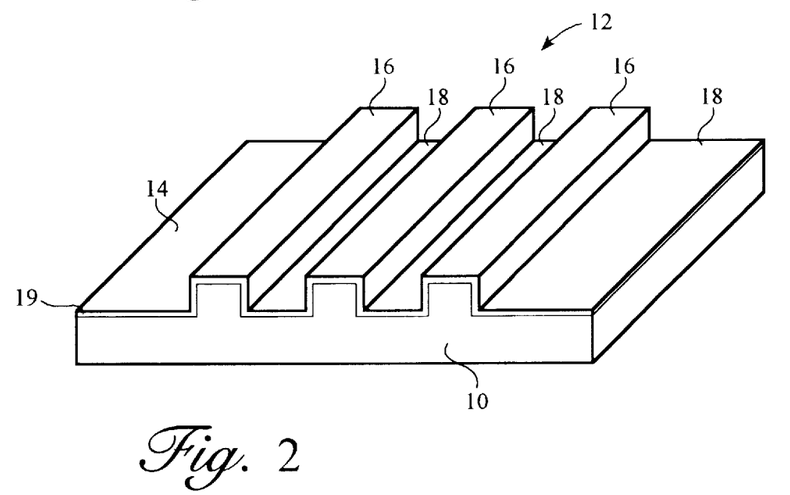
FIG. 2 is an enlarged perspective view of the portion of the standard within the area designated by the circle 2 in FIG. 1.

Referring to the enlarged view in FIG. 2, the regular surface features 12 on the top surface 14 of the die are seen to be a periodic pattern of alternating parallel flat linear mesas 16 and valleys 18 with a one-dimensional square-wave, i.e. rectangular, cross-section. The top surface 14 itself is a generally smooth reflective surface but for the steps created by the alternating mesas 16 and valleys 18. That is, the tops of the mesas 16 are generally planar, smooth and specularly reflective, and likewise the surface in the valleys 18 is generally planar, smooth and specularly reflective, with minimal haze. A thin film of native oxide 19 generally forms on the otherwise bare silicon substrate 10.

The oxide film 19 should not be removed, since a new film will naturally form again, and the surface must be stable for the calibration standard to maintain a certified step height value. Any cleaning process which changes the microlevel texture of the standard's surface, even blowing with a compressed gas, will change the step height value, such that the standard will require recertification. Similarly, the standard should not be exposed to high temperatures that would grow the oxide film 19, nor should the standard be allowed to get wet. To prevent particles from contaminating the surface and diminishing the accuracy of the standard, the standard should be stored in a container with a class 10 environment or better, and should only be removed from its container when ready to perform a calibration measurement, then returned immediately to the container. Care should be exercised in handling the standard.

Figure 3:
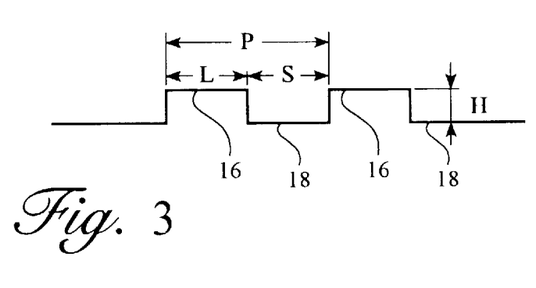
FIG. 3 is a schematic side view of a cross-section of the standard of FIG. 1, illustrating the various parameters, pitch (P), line width (L), space width (S) and step height (H) measured by the certification method of the present invention.

Turning now to FIG. 3, the cross-section of the regular pattern of features exhibits a number of parameters that can be quantified. Since the pattern is periodic, it has a periodicity or pitch P which is the width dimension across mesa-valley pairs. This pitch dimension P is made up of contributions from the line width L, which is the width dimension across the mesas, and the space width S, which is the width dimension across the valleys. Thus, P=L+S. We can also define a duty cycle (C) from any two of those measured quantities. C=L/P=1−(S/P)=L/(L+S). The final measurable quantity is the step height H, which is the depth dimension from the top of the mesas to the floor of the valleys. As will be discussed further below with reference to FIGS. 7 and 8, the step height is intrinsically an average value in any actual calibration standard.

Referring now to FIGS. 4A–4F and 5A–5F, two processes for making the surface features on the wafer die that form the calibration standard are shown. The processes are described in U.S. Pat. No. 5,599,464. The figures show the manufacture of a single feature, but in practice, all of the features on the wafer would be made simultaneously.

Figure 4A:
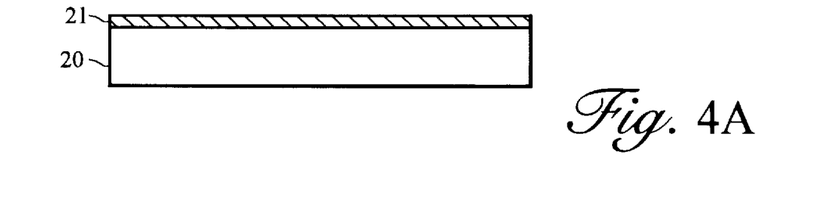
FIGS. 4A–4F and FIGS. 5A–5F are side views of a wafer step height standard in various stages of manufacture according to two respective manufacturing processes.

FIG. 4A shows a silicon wafer 20 having a uniform layer 21 of silicon dioxide thermally grown onto the silicon substrate. The silicon dioxide layer has a thickness of between 500 Å and 1000 Å. In the book Silicon Processing for the VLSI Era, vol. 1, p. 200–212, the thermal oxidation of silicon is explained. The book mentions that Deal and Grove described silicon oxidation as proceeding by the diffusion of an oxidant, such as molecular oxygen, through an existing oxide to the silicon-silicon dioxide interface, where molecules react with silicon to form silicon dioxide. In other words, oxygen migrates to the bare silicon substrate, where it interacts with silicon, thereby lowering the level of the silicon/silicon dioxide interface in places where oxidation has occurred. This is a key aspect of the present invention.

Figure 4B:
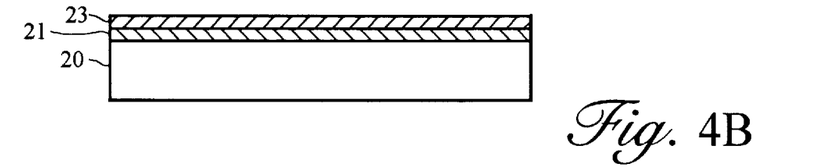

In FIG. 4B, a thin layer 23 of positive photoresist is applied. The photoresist may be patterned with the desired location, areawise extent and overall density of features by means of a mask. When light is used to expose the photoresist layer 23 through the mask, a latent image of the features is formed in the photoresist by light. In other words, the chemical bonds in the exposed photoresist are broken, altering the molecular weight and solubility of the resist, which allows the latent image to be developed, removing the exposed photoresist in the etched area, uncovering the underlying silicon dioxide layer. In the case of positive photoresist, the bonds of the exposed photoresist are broken.

Figure 4C:
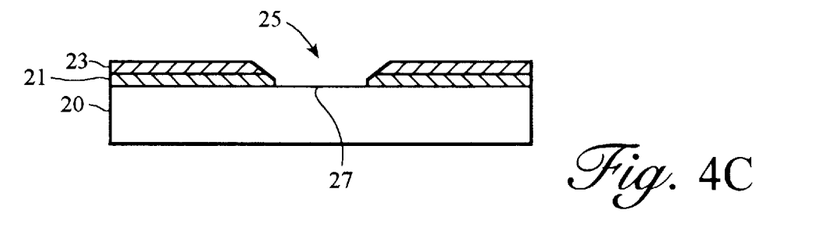

In FIG. 4C, portions of the resist layer 23, now removed, create an aperture 25 where the resist has been exposed by light. An oxide etchant is used to remove silicon dioxide down to the upper surface 27 of the silicon substrate 20, which is uniformly lower than the original level.

Figure 4D:
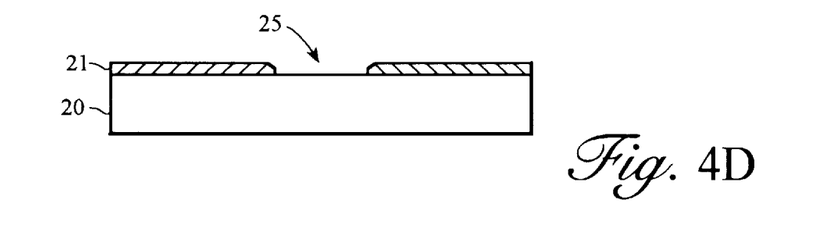
Figure 4E:
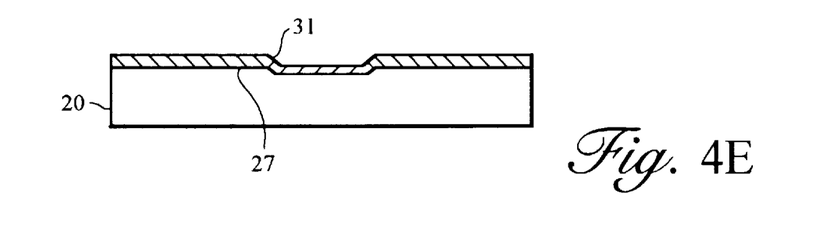

In FIG. 4D, the photoresist is stripped from the oxide layer 21. The aperture region 25, now a single trench 31 in an array of similar trenches which will form topographic features, including the light scattering features of the present invention, undergo self-limiting reoxidation due to exposure to air. Any oxidizing ambient environment could be used, but air is effective and inexpensive. Air oxidation at room temperature produces native oxide which has a thickness of approximately 17 Å. Approximately half of the native oxide layer consumes silicon at the substrate interface. This is shown in FIG. 4E, where the native oxide at the bottom of a pit extends into the silicon substrate, below the former level 27 supporting the silicon dioxide. The formation of the native oxide layer is rapid, but generally stops by itself after a short time.

Figure 4F:
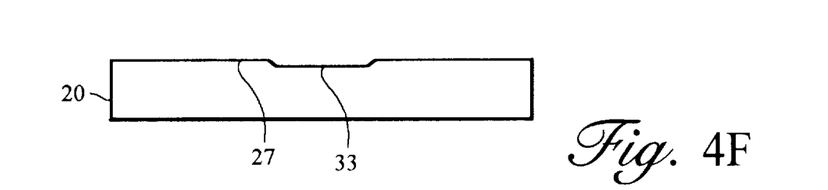

Next, all of the oxide is stripped, as shown in FIG. 4F. It is now apparent that a differential step height exists between the bottom of the trench 33 and the former base 27 which supported the silicon dioxide.

In FIGS. 4A–4F, the construction of a topographic feature has been shown using a dark field mask, resulting in a pit 33 within a light reflecting field 27. A reverse process could be used, producing a mesa feature having a step height, rather than a trench. The reverse process could be achieved with reverse masks or with photoresist of the opposite type. This reverse process is illustrated in FIGS. 5A–5F.

Figure 5A:
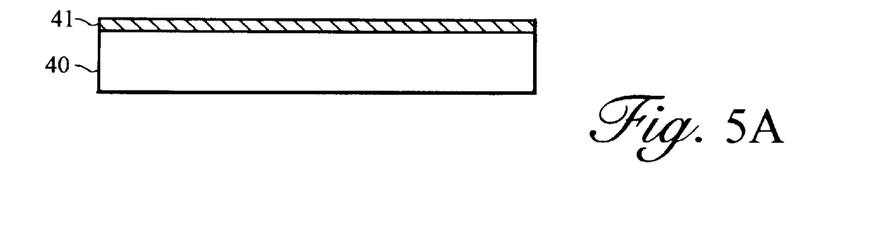

In FIG. 5A, a uniform thermal oxide layer 41 is grown on a polished, light-reflective silicon wafer to a thickness which is between 700 Å and 1000 Å. Such layers are readily produced in the semiconductor industry with good consistency and uniform thickness over the surface of a wafer. Lesser thicknesses could be produced, but the range of 700 Å to 1000 Å is preferred because of the ease of manufacturing and of verifying the thickness with measuring instruments.

Figure 5B:
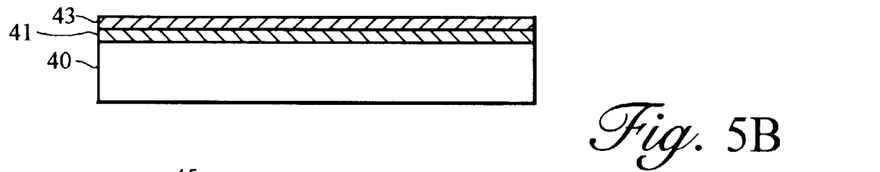

In FIG. 5B, a layer of photoresist 43 is disposed over the thermal oxide layer 41. The photoresist is exposed to light through a mask which is the optical complement of the mask used for the exposure previously described with respect to FIGS. 4B and 4C.

Figure 5C:
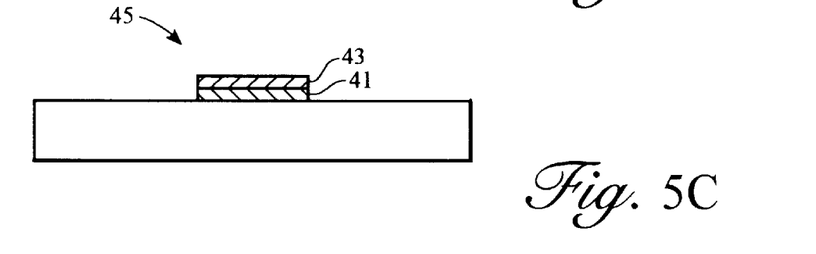
Figure 5D:
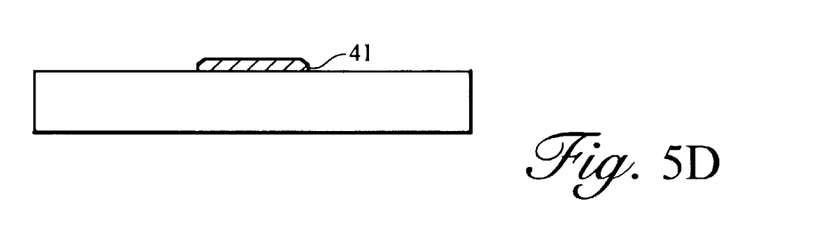

After removing the exposed portions of the photoresist and etching the oxide, a mesa is left, as shown in FIG. 5C. The mesa 45 consists of a small layer of photoresist 43 atop a similarly sized layer of thermal oxide 41. In FIG. 5D, the photoresist portion is shown to be stripped away.

Figure 5E:
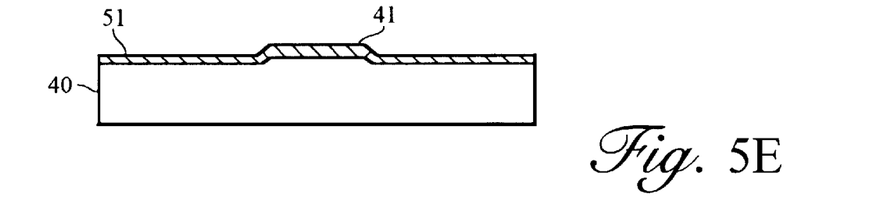
Figure 5F:
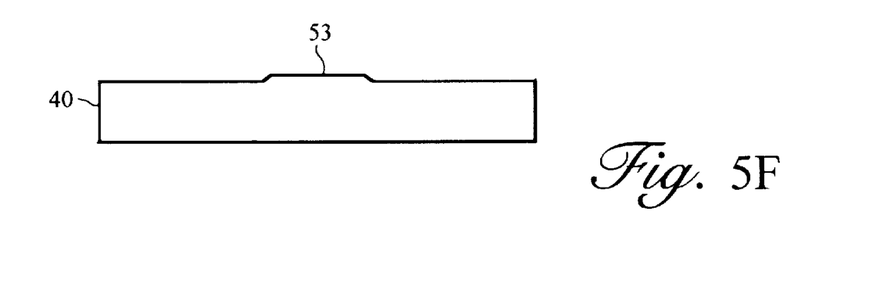

In FIG. 5E, a very thin layer of native oxide 51 grows on the exposed silicon as air is allowed to be in contact with the wafer, consuming silicon below the initial wafer level. The silicon dioxide island 41 is removed, leaving a small mesa or feature 53, which also is exposed to air and has a uniformly thin native oxide layer. The feature 53 extends approximately 8 Å to 9 Å above the surface of the surrounding silicon field.

Figure 6:
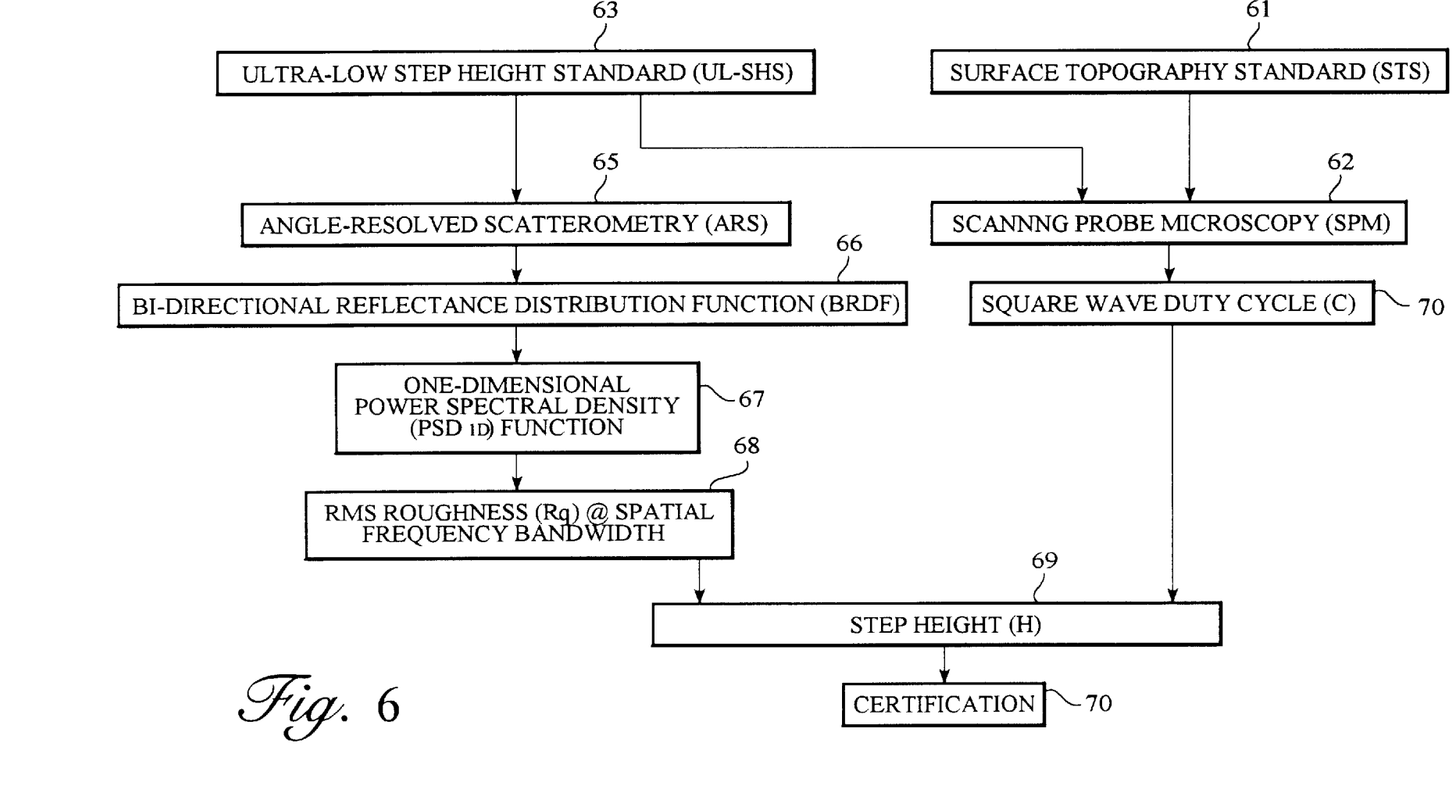
FIG. 6 is a flow diagram showing the steps of the certification process of the present invention for the standard of FIG. 1.

With reference to FIG. 6, certification of the standard is based primarily on a measurement of rms microroughness ($R_q$) that is traceable to physical first principles analysis. For a one-dimensional square-wave (rectangular) cross-section and a 50% duty cycle for the pattern features, the step height H is equal to 2 $R_q$. This relationship has to be modified slightly when the duty cycle is not exactly 50%, but essentially the characteristic step height of this particular standard is derivable from angle-resolved scatterometry measurements. For accuracy, the scatterometry measurement is supplemented by an atomic force microscope (or other scanning probe microscope) measurement of pitch and line widths to obtain the duty cycle of the pattern. Although atomic force microscopes have been found unsuitable for certification purposes of direct step height measurement of ultra-low step features (H≤50 Å), they are capable of accurate measurement of the pitch, line and space widths, which are typically on the order of about 5 $\mu$m to 50 $\mu$m wide.

Beginning with the duty cycle determination, the scanning probe microscope (SPM), such as an atomic force microscope, is first calibrated for accurate width measurement by means of a surface topography standard (STS) 61. That standard is traceable to NIST SRM-476. Once the SPM has been calibrated, it is used to measure (step 62) the pitch (P) line and space widths (L and S) of the features on the ultra-low step height standard (UL-SHS) 63 to be certified. From any two of these measurements, the duty cycle (C) is derived (step 64) according to the definition C=L/P=1−(S/P), where P=L+S is the pitch and L and S are the line widths of the mesa features and space widths of the valleys, respectively.

Next, the microroughness value $R_q$ is measured by means of optical scatterometry. In particular, angle-resolved scatterometry (step 65) is employed to obtain a bi-directional reflectance distribution function (BRDF) 66 for light scattered from the periodic pattern of surface features. Specifically, the periodic pattern acts as a kind of grating that scatters light in certain preferential directions, with the intensity of the various scattering directions dependent upon the pattern dimensions, including the step height H. An illumination laser beam with a 3 mm diameter spot size on the standard and a 633 nm wavelength is typical for a scatterometer. From the measured BRDF, a one-dimensional power spectral density ($PSD_{1D}$) function is calculated (step 67), and from that $PSD_{1D}$ function the rms roughness ($R_q$) value is derived (step 68). The measurement and calculations are preferably carried out for a spatial bandwidth of at least from a minimum spatial frequency $f_{min} \approx 1/(2P)$ to a maximum spatial frequency $f_{max} \geq 25\ f_{min}$, in order to capture at least out to the 11th order odd harmonic of light scattering. Preferably, $f_{max} \approx 1.2\ \mu m^{-1}$, which for a typical pitch P of about 20 $\mu$m well exceeds the 25 $f_{min}$ lower limit for $f_{max}$. The minimum spatial frequency $f_{min}$ is selected simply to ensure that it captures the fundamental order of light scattering at spatial frequency $f_1=1/P$. The traceability of the $R_q$ measurement is traceable to intrinsic standards set forth in ANSI/NCSL ZS40 and ISO 10012.

The calculation of rms microroughness $R_q$ by means of optical scatterometry measurements on a standard having the above-described periodic pattern of surface features is described in copending U.S. patent application Ser. No. 08/908,524, filed Aug. 7, 1997, assigned to the assignee of the present invention. Briefly, the scatterometry instrument may be a TMA CASI(r) angle-resolved light scattering (ARS) instrument. This is a specialized tool that allows for first-principles traceability based on the wavelength of light and optical geometries of the instrument. The actual quantity measured through angle-resolved scatterometry is the bi-directional reflectance distribution function (BRDF), $$BRDF = \frac{P_s/\Omega_s}{P_i \cdot \cos\theta_s}, \quad (1)$$

where $P_s$ is the power of the scattered light collected over the solid angle $\Omega_s$ as a function of the angle $\theta_s$. The factor $P_i$ indicates the incident laser power at angle $\theta_i$ from the wafer normal. Therefore, BRDF is physically nothing more than the redistributed energy scattered into a given solid angle.

In the case of a laser based instrument, such as an integrating scatterometer, the bandpass is defined as follows. If the incident monochromatic laser beam, at incidence angle $\theta_i$, specular beam and scatter beams (at angles $\theta_s$) are all in the same plane, the spatial frequency is related to the scatter angle by the one-dimensional grating equation $$f = \frac{\sin\theta_s \cdot \cos\phi_s - \sin\theta_i}{\lambda}, \quad (2)$$

where f is the spatial frequency and $\lambda$ is the laser illumination wavelength. The $\phi_s$ term takes on values of 1.0 and −1.0 for $\phi_s=0°$ and 180° respectively.

Ideally, the instrument transfer function is flat in the bandpass region and zero elsewhere. This is never achieved in practice and the spatial bandpass must always be convolved with the transfer function (if available) in order to achieve true inter-instrument comparisons.

The one-dimensional power spectral density (PSD) function is a measure of the scattered power per unit of spatial frequency f. The PSD function is calculated from the measured BRDF:

$$PSD(f_x, f_y) = \frac{10^8 \lambda^4 \, BRDF}{16\pi^2 \cdot \cos\theta_s \cdot Q}, \quad (3)$$

where, for s-polarization, the factor Q is approximated by the specular reflectance of the wafer surface. The reflectance is a function of wavelength, incidence angle, and polarization. If the surface is isotropic, $PSD(f_x, f_y)$ may be integrated around the azimuthal angle $\phi_s$ to obtain an isotropic PSD function $$PSD_{iso}(f) = \int_o^{2\pi} PSD(f_x, f_y) f \, d\phi_s = 2\pi f \cdot PSD(f_x, f_y) \quad (4)$$

with units of Å² µm and f equals the root-sum-of-squares of $f_x$ and $f_y$. It is this function, $PSD_{iso}(f)$ in equation 4, that is added to the one-dimensional PSD function and becomes the function from which rms roughness is calculated. The square wave is a one-dimensional scatterer, however, the roughness of the silicon "peaks and troughs" are isotropic scatterers. Therefore, two measurements are made—one with the direction of the square wave surface perpendicular to the plane-of-incidence of the laser (for the overall one-dimensional PSD curve generation), and one where the surface is parallel. The second scan measures the silicon roughness, independent of the etched features. This value is then converted to an isotropic value, equation 4, and then added as the root-sum-of squares to the one-dimensional scan (equation 7). The silicon roughness is really only significant at low nominal roughness values but is consistently measured as a matter of practice.

The PSD function is the frequency spectrum of the surface roughness measured in units of spatial frequency, typically inverse micrometers. The PSD function provides information about both the amplitude and spatial wavelength (1/f) of the surface. The rms roughness may be calculated directly as the square root of the integral of the one-dimensional PSD curve. In the case of the rms microroughness standard, an isotropic roughness value needs to be added in as well to account for the inherent roughness of the silicon. The rms roughness, $R_q$, between spatial frequencies $f_{min}$ and $f_{max}$, from a one-dimensional power spectral density function, $PSD_{1D}$, is $$R_q = \sqrt{2 \cdot \int_{f_{min}}^{f_{max}} PSD_{1D}(f) \, df} \quad (5)$$

Since all of the data from angle-resolved scatterometry are binned into discrete points, the "integration" required to turn these data into a rms-roughness value merely becomes the square root of the summation of the one-dimensional PSD function, $PSD_{1D}(f)$, multiplied times the differential frequency step size within the appropriate limits of integration.

$$R_q = \left(2 \int_{f_l}^{f_h} PSD_{1D}(f) \, df\right)^{1/2} \Rightarrow R_q \quad (6)$$

$$= \sqrt{2 \sum_{i=f_l}^{f_h} PSD_{1D} \delta f}$$

Note also that the equation signifies the limits of integration denoted $f_l$ and $f_h$ which are set according to the spatial bandwidth limits of the instrument under test. To account for the inherent isotropic roughness of the silicon, we also need to add in an additional term $PSD_{iso}$ to equation 6. The final formula for the RQS standard takes the form of equation 7.

$$R_q = \left(2\int_{f_l}^{f_h} PSD_{1D}(f) \, df + \int_{f_l}^{f_h} PSD_{iso}(f) \, df\right)^{1/2} \quad (7)$$

This is the equation that is used to certify a rms-roughness value for the standard for a given range of integration limits.

Once both the duty cycle C and the microroughness value $R_q$ from a one-dimensional power spectral density function ($PSD_{1D}$) are known (equation 6), the characteristic step height H of the features on the standard is determined (step 69) according to the equation: $H = R_q \, [C(1-C)]^{-1/2}$. The standard is certified (step 70) as having the determined step height H and duty cycle C for use in subsequently calibrating step height measuring instruments.

Calibration comprises placing the certified step height standard into step height measuring relation to an instrument, such as an atomic force microscope or other scanning probe microscope, interferometer or other optical profilometer. After measuring the step height with the instrument, either directly or through a series of calculations from indirect measurements, the resulting measured value is compared against the known certified value of the step height H. Any deviations of the measured value obtained from the instrument to be calibrated to the known certified value are used to adjust the instrument until the measured and certified values are equal within certified uncertainty.

Figure 7:
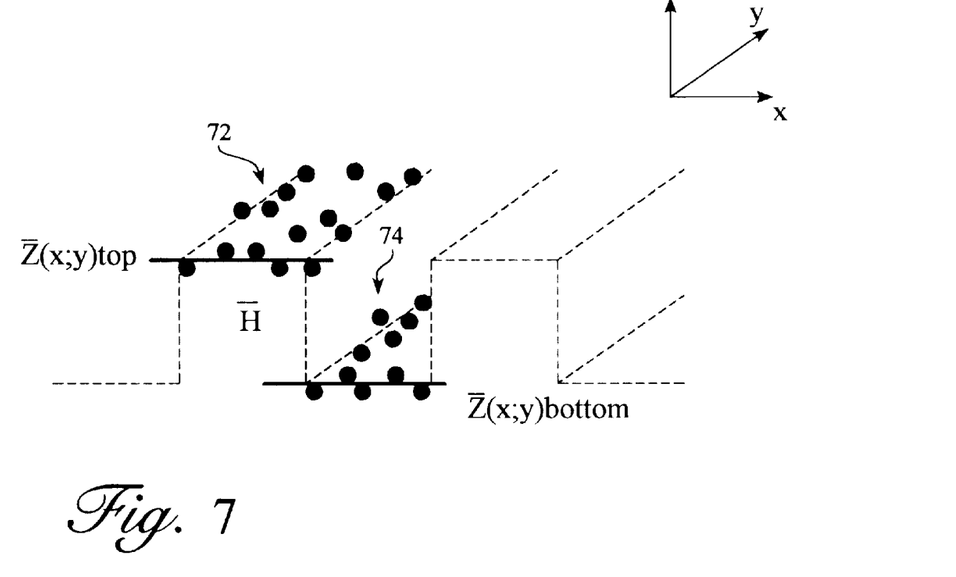
FIGS. 7 and 8 are, respectively, a schematic perspective view of the standard and a graph of measured depth versus frequency of measured occurrences, illustrating the intrinsically statistical average nature of measured step-height.
Figure 8:
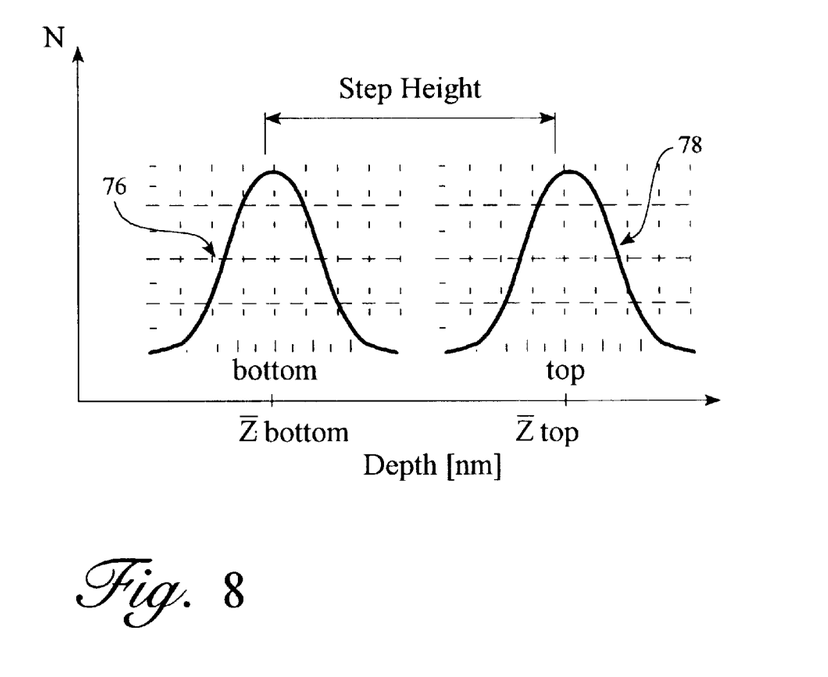

With reference to FIGS. 7 and 8, the definition of the characteristic step height H is necessarily an effective or mean step height due to the intrinsic surface texture of the standard itself. The etched silicon substrate's surface has a thin film of native oxide (as seen in FIG. 2). The oxide film is an amorphous silica ($SiO_2$) with a nominal molecular "diameter" of about 3.55 Å. Even the best standard would have this amorphous silica film which produces microtextured mesa and valley surfaces 72 and 74. The dots shown in FIG. 7 represent the amorphous silica "molecules". Due to the very low levels of surface texture provided by the features (a typical step height H is about 10 Å, which is only 2.8 times the nominal silica "diameter"), any step height measurement is necessarily statistical in nature. FIG. 8 illustrates the height or depth Z of various portions of the mesa and valley features. The number of occurrences N of a particular depth measurement is plotted versus the depth Z, and shows a (bell-shaped) Gaussian distribution about a mean $\overline{Z}$ for both the mesas and valleys. The first curve 76 represents depth measurements for various parts of the valleys and has a mean $\overline{Z}_{bottom}$. The second curve 78 represents corresponding depth measurements for various parts of the top surface of the mesa features and has a mean $\overline{Z}_{top}$. The step height H is a mean value $\overline{H}$ that is:

$$\overline{H} = \overline{Z(x,y)}_{top} - \overline{Z(x,y)}_{bottom},$$

where measurements are averaged over surface positions (x,y). Note that the statistical nature of the feature depths occurs even when all of the mesas 72 have identical average depths $\overline{Z}_{top}$ and all of the valleys 74 likewise have identical average depths $\overline{Z}_{bottom}$. Height variations between different features are also possible and are averaged out by the scatterometry measurements with the 3 mm diameter illuminating laser spot, which encompasses parts of about 300 different mesa and valley features.

We claim:

1. A method of certifying a step height calibration standard, said standard being a physical artifact having a generally smooth reflective surface but with regular features formed on said surface, said regular surface features being a periodic pattern of alternating parallel flat linear mesas and valleys with a one-dimensional square-wave cross-section, said pattern of alternating mesas and valleys having a periodicity or pitch of less than 100 μm, a duty cycle known to be approximately 50% and a characteristic step height of at most 100 Å, said method of certifying comprising the steps of:

measuring a bi-directional reflectance distribution function (BRDF) for light scattered from said periodic pattern of surface features using an angle-resolved scatterometer, and calculating an rms roughness ($R_q$) value from said BRDF measurement; and determining said characteristic step height (H) of said pattern of features on said standard from said calculated $R_q$ value and an assumed 50% duty cycle, said standard being certified as having said regular surface features with said determined characteristic step height (H) for use in subsequently calibrating step height measuring instruments by means of said certified standard.

2. The certification method of claim 1 further comprising:

measuring said pitch (P) of said periodic pattern of surface features and at least one of a line width (L) of said mesas and space width (S) of said valleys using a calibrated probe microscope, and verifying a duty cycle (C) of said pattern from said measurements, where C=L/P=1−(S/P), said standard further being certified as having said pattern of surface features with said verified duty cycle (C), said determination of characteristic step height (H) being according to the equation: $H=R_q [C(1-C)]^{-\frac{1}{2}}$.

3. The certification method of claim 1 wherein said $R_q$ value is derived from a one-dimensional power spectral density (PSD) function that is calculated from said BRDF measurement.

4. The certification method of claim 1 wherein said $R_q$ value is obtained over a spatial frequency bandwidth of at least from $f_{min} \approx 1/(2P)$ to $f_{max} \geq 25\ f_{min}$.

5. A method of certifying a step height calibration standard, said standard being a physical artifact having a generally smooth reflective surface but with regular features formed on said surface, said regular surface features being a periodic pattern of alternating parallel flat linear mesas and valleys with a one-dimensional square-wave cross-section, said pattern of alternating mesas and valleys having a periodicity or pitch of less than 100 μm and a characteristic step height of at most 100 Å, said method of certifying comprising the steps of:

measuring said pitch (P) of said periodic pattern of surface features and at least one of a line width (L) of said mesas and space width (S) of said valleys using a calibrated probe microscope, and deriving a duty cycle (C) of said pattern from said measurements, where C=L/P=1−(S/P)

measuring a bi-directional reflectance distribution function (BRDF) for light scattered from said periodic pattern of surface features using an angle-resolved scatterometer, calculating a one-dimensional power spectral distribution (PSD) function from said BRDF measurement, and deriving an rms roughness ($R_q$) value from said PSD function, wherein said $R_q$ value is obtained over a spatial frequency bandwidth of at least from $f_{min} \approx 1/(2P)$ to $f_{max} \geq 25\ f_{min}$, and determining said characteristic step height (H) according to the equation:

$$H=R_q\ [C(1-C)\ ]^{-\frac{1}{2}},$$

wherein said standard is certified as having said regular surface features with said determined characteristic step height (H) and duty cycle (C) for use in subsequently calibrating step height measuring instruments by means of said certified standard.

6. The certification method of claim 5 wherein said physical artifact constituting said standard is a silicon wafer die.

7. The certification method of claim 6 wherein said die is mounted on a larger substrate.

8. The certification method of claim 5 wherein said pitch (P) is about 20 μm.

9. The certification method of claim 5 wherein said duty cycle (C) is about 50%.

10. The certification method of claim 5 wherein said scatterometer directs an incident laser beam with a diameter of about 3 mm onto said periodic pattern.

11. The certification method of claim 5 wherein said probe microscope is an atomic force microscope calibrated with a surface topography standard traceable to published NIST SRM-476.

* * * * *